UNITED STATES PATENT OFFICE.

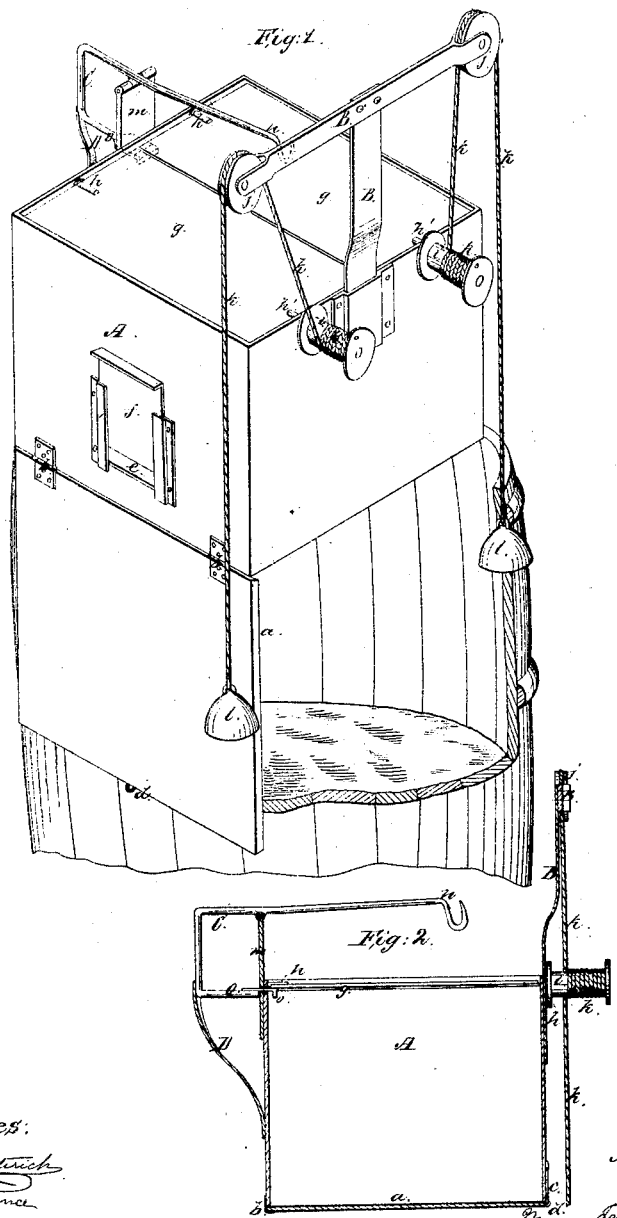

JOSHUA W. BRADWAY, OF AKRON, INDIANA.

IMPROVEMENT IN ANIMAL-TRAPS.

Specification forming part of Letters Patent No. 38,024, dated March 31, 1863.

*To all whom it may concern:*

Be it known that I, J. W. BRADWAY, of Akron, in the county of Fulton and State of Indiana, have invented a new and useful Improvement in Animal-Traps; and I do hereby declare that the following is a full, clear, and exact description of the same, reference being had to the accompanying drawings, forming part of this specification, in which—

Figure 1 is a perspective view of my trap as placed over a barrel for use. Fig. 2 is a vertical cross section of the same as used when not placed on a barrel, but on the ground or floor.

Similar letters of reference in the several figures indicate corresponding parts.

A is a rectangular box, with a bottom, *a*, opening on hinges *b b*, and held closed by a hook and staple, as at *c d*. In one side of this box an aperture, *e*, is cut, and over this aperture a slide-door, *f*, is placed, as shown. The top of the box is formed of two revolving plates or boards, *g g*, which have short axial journals *h h'* at each of their ends. These journals are centrally located on each of the plates or boards, and have their support in the front and rear ends of the box, as shown. The front journals, *h' h'*, extend out beyond the front of the box and receive flanged drums or spools *i i*, which are keyed fast.

B is a cross or T-shaped support, set firmly on the upper front part of the box. The vertical portion of this support has an angular bend in it, and extends up some distance beyond the top of the box. In the forked ends of the horizontal portion of said support pulleys *j j* are hung loosely, so as to revolve. From the spools or flanged drums cords *k k* pass and run over the pulleys *j j*. These cords are attached by one end to the drums, and on their other ends weights *l l* are suspended, as represented.

C is an angular trigger and hook combined. The hook *n* of the device C overhangs the division-line of the two sections *g g* of the top of the box, and plays up and down on the bracket-support *m* of the box. The trigger part *o* extends through a hole in the back of the box A, just below the revolving sections *g g* of the top of the box and under the division-line thereof, as shown. This part plays horizontally in and out of the hole under the edges of the revolving sections. A spring, D, keeps it under the said sections when the hook is not pulled down by an animal, but allows it to move from under the sections when the hook is thus pulled upon.

It will be observed that no shafts extend across the receptacle of my trap, and therefore when the revolving sections are released the full space for the descent of the animal is secured.

The operation is thus: The hook is baited, the trap set for continuous operation during a night or given length of time by winding up the weighted cords. Now, if an animal crawls upon the top of the trap and draws upon the baited hook the trigger *o* will move out from under the revolving sections *g g*, and as these sections are thus left unsupported the weighted cords will draw upon the flanged drums and thereby cause the sections to revolve in the direction of the arrows, and thus leave the animal to descend in the space below, and, as quick as thought, close him therein by completing their motion and having their further revolution at that time arrested by the trigger *o*, which had previously regained its original position. The same operation is repeated when another animal draws upon the bait. In a word, the trap operates in the manner described until the whole length of the weighted cords is expended or unwound. If it is desired to destroy the animals as fast as caught, the bottom of the box may be opened and the trap placed over a water-vessel, as shown in Fig. 1, or, if desired, it may be used over a dry well and the animals kept alive in the manner shown in Fig. 1.

I do not claim a revolving top, nor a top made in sections, nor do I claim a bottomless trap, nor do I claim weights and cords applied to a trap, nor do I claim, broadly, a trigger which supports the revolving or tilting top; but

What I claim as my invention, and desire to secure by Letters Patent, is—

The arrangement of the box A, hinged bottom *a*, revolving sections of top *g g*, flanged drums *i i*, T-shaped support B, pulleys *j j*, weighted cords *k k*, combined hook and trigger *n o*, support *m*, and spring D, all in the manner and for the purpose herein described.

JOSHUA W. BRADWAY.

Witnesses:
DAVID SECOR,
JESSE B. MIDDLETON.